(12) United States Patent
Kashiyama

(10) Patent No.: US 6,473,568 B2
(45) Date of Patent: Oct. 29, 2002

(54) CAMERA HAVING ILLUMINATION DEVICE AND CONTROL FUNCTION FOR SAME

(75) Inventor: Ritsuo Kashiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/934,704

(22) Filed: Aug. 23, 2001

(65) Prior Publication Data

US 2002/0028072 A1 Mar. 7, 2002

(30) Foreign Application Priority Data

Sep. 1, 2000 (JP) ........................... 2000-264925

(51) Int. Cl.⁷ .................. G03B 13/36; G03B 15/03
(52) U.S. Cl. ........................ 396/106; 396/157
(58) Field of Search .................... 396/157, 106

(56) References Cited

U.S. PATENT DOCUMENTS 5,051,763 A * 9/1991 Yukevich, Jr. ............. 396/157
5,227,836 A * 7/1993 Yasukawa et al. .......... 396/157
6,259,862 B1 * 10/2001 Marino et al. .............. 396/106

* cited by examiner

*Primary Examiner*—W. B. Perkey
(74) *Attorney, Agent, or Firm*—Fitzpatrick, Cella, Harper & Scinto

(57) ABSTRACT

In a camera which includes an electronic flash device for illuminating a subject and a photo-taking mode setting member, the photo-taking mode setting member can be set to any one of: (a) a first mode, in which the electronic flash device emits light during a recording medium exposure operation, and emits auxiliary light during a focal point detection operation by a focal point detecting device; (b) a second mode, in which the electronic flash device does not emit light during a recording medium exposure operation, but the electronic flash device emits auxiliary light during a focal point detection operation by the focal point detecting device; and (c) a third mode, in which the electronic flash device emits light during a recording medium exposure operation, but the electronic flash device does not emit auxiliary light during a focal point detection operation by the focal point detecting device.

4 Claims, 9 Drawing Sheets

FIG. 5A
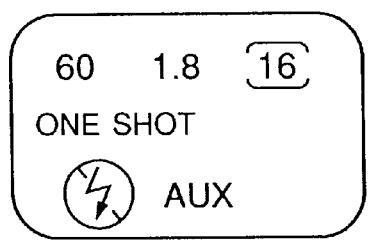
ELECTRONIC FLASH MODE SW ON
ELECTRONIC FLASH MODE SW ON
FIG. 5B
FIG. 5C
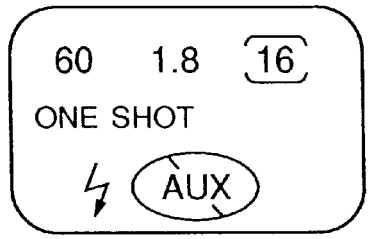 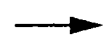 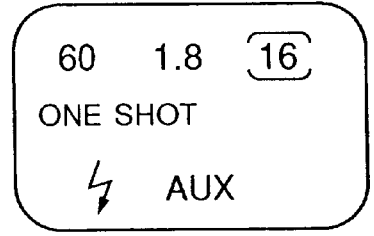
ELECTRONIC FLASH MODE SW ON

CAMERA HAVING ILLUMINATION DEVICE AND CONTROL FUNCTION FOR SAME

BACKGROUND OF THE INVENTION

1. Field of the Invention

The present invention relates to a camera and a camera system for emitting auxiliary light for detecting a focal point using an electronic flash.

2. Description of the Related Art

Hitherto, cameras having an automatic focal point (focus condition) detecting device, and in particular, cameras employing a phase difference detecting system for detecting a focal point, sometimes irradiate auxiliary light for detecting a focal point to a subject when the subject does not have sufficient brightness or contrast in order to improve a focal point detecting capability. There have come onto the market cameras having a function for emitting auxiliary light for illuminating a subject using an electronic flash. This function is realized by means of an electronic flash built into the camera as a light source for irradiating auxiliary light.

Many of these cameras employ a pop-up type built-in electronic flash. This type of electronic flash is arranged such that when it is popped up, it emits light in a film exposing operation. Thus, when the electronic flash is popped up in order to emit auxiliary light, it also emits light in the film exposing operation.

In the above conventional example, however, when it is desired to take a picture without using an electronic flash, e.g., with an intention of creating the picture regardless of whether a focal point cannot be detected without auxiliary light, the focal point cannot be detected by automatic focusing, and focusing must be executed manually.

Further, when the electronic flash is set to an operable state, it emits light both in the film exposing operation and when auxiliary light is necessary. Thus, when it is desired e.g., not to use auxiliary light emitted from the electronic flash, because the auxiliary light causes glare, use of the electronic flash in the film exposing operation must be refrained or auxiliary light emitted from the electronic flash cannot must be used regardless of whether the use of the auxiliary light is desired or not.

SUMMARY OF THE INVENTION

Accordingly, it is an object of the present invention to provide a camera and a camera system which permit a photographer to properly use an electronic flash easily according to his or her intention for creating a picture, environments in which the electronic flash is used, and the like.

According to one aspect of the present invention, in a camera system having an illumination device for illuminating a subject and a photo-taking mode setting member, the photo-taking mode setting member can set the camera in one of three modes: (a) a first mode, in which the illumination device emits light during a recording medium exposure operation, and emits auxiliary light during a focus condition detection operation by the focus condition detecting device; (b) a second mode, in which the illumination device does not emit light during a recording medium exposure operation, but the illumination device emits auxiliary light during a focus condition detection operation by the focus condition detecting device; and (c) a third mode, in which the illumination device emits light during a recording medium exposure operation, but the illumination device does not emit auxiliary light during a focus condition detection operation by the focus condition detecting device.

Further objects, features and advantages of the present invention will become apparent from the following description of the preferred embodiments with reference to the attached drawings.

BRIEF DESCRIPTION OF THE DRAWINGS

FIGS. 5A to 5C are views showing how an image is displayed on an external liquid crystal display unit provided with the camera according to the first embodiment of the present invention;

DESCRIPTION OF THE PREFERRED EMBODIMENTS

The present invention will be described below in detail with reference to an illustrated embodiment of the present invention.

Figure 1:
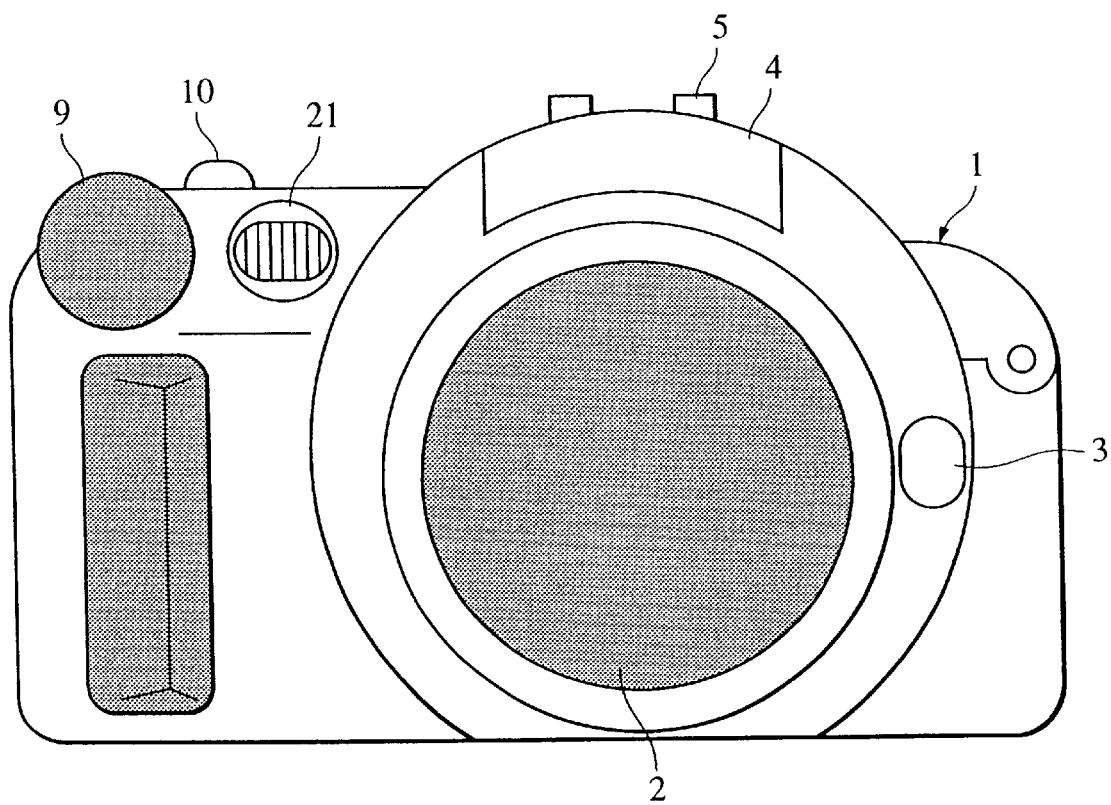
FIG. 1 is a front elevational view of a camera according to a first embodiment of the present invention.
Figure 2:
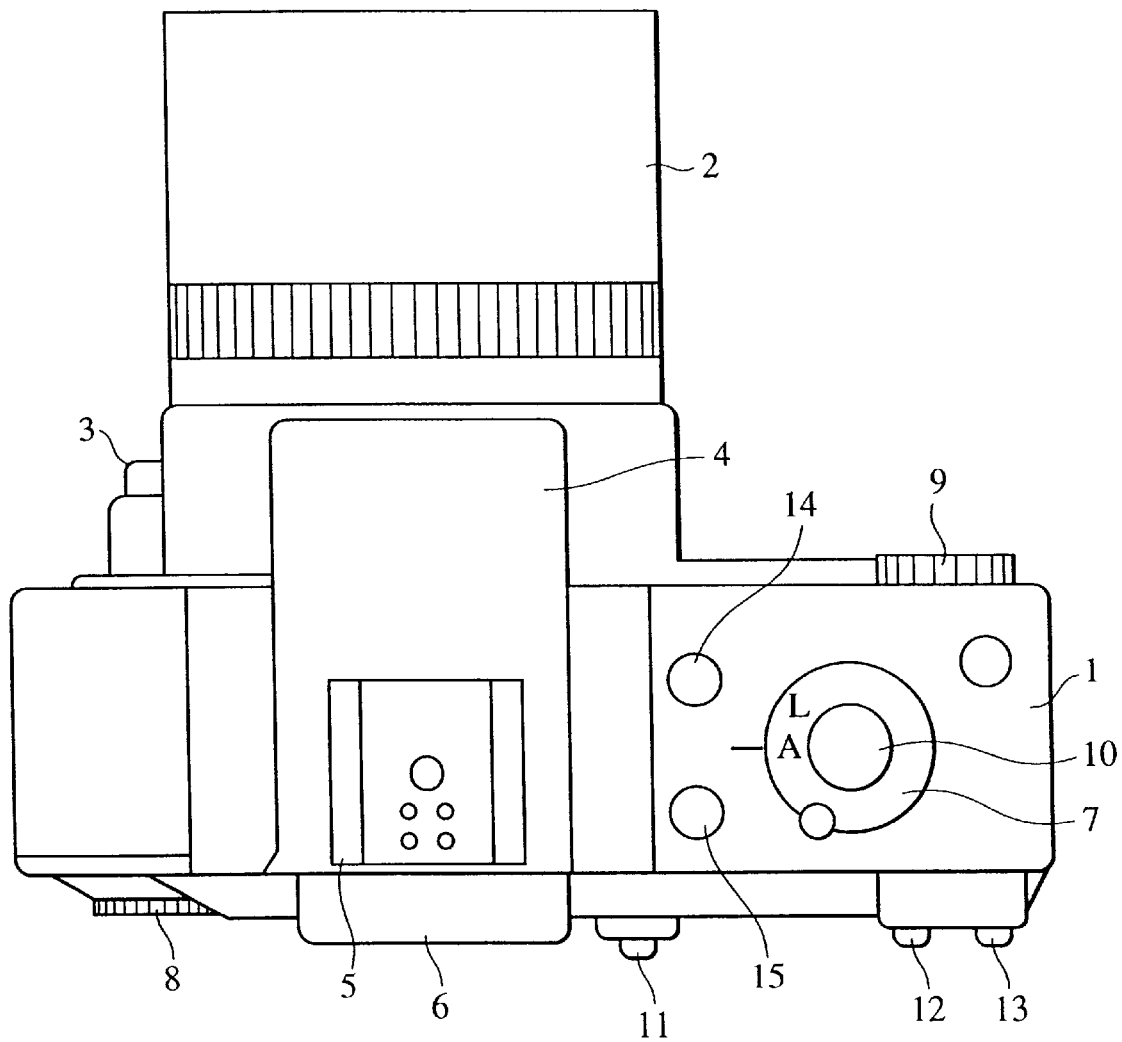
FIG. 2 is a top plan view of the camera according to the first embodiment of the present invention.
Figure 3:
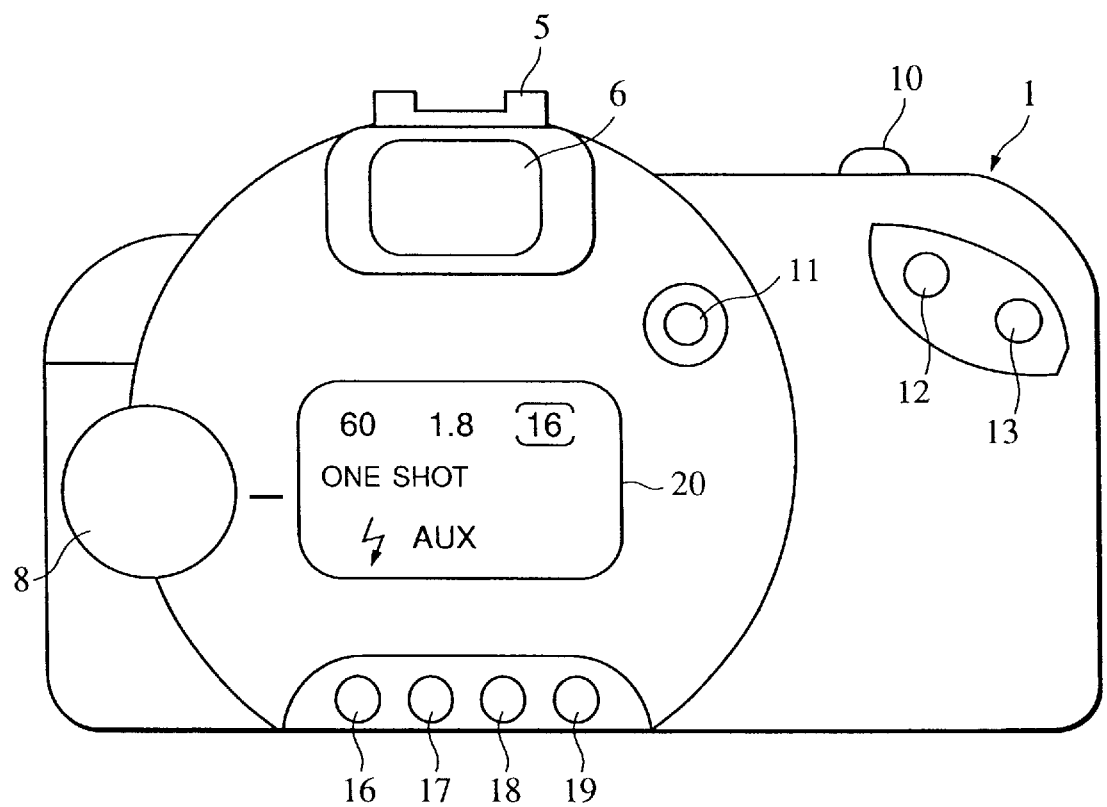
FIG. 3 is a rear elevational view of the camera according to the first embodiment of the present invention.
Figure 4A:
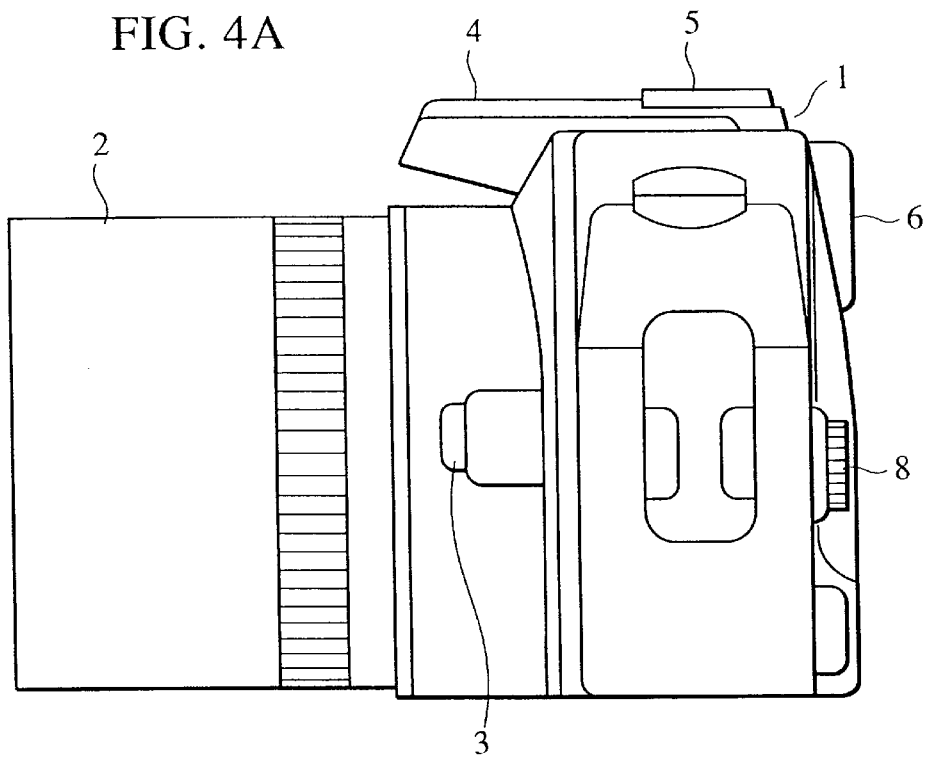
FIGS. 4A and 4B are side elevational views of the camera according to the first embodiment of the present invention.
Figure 4B:
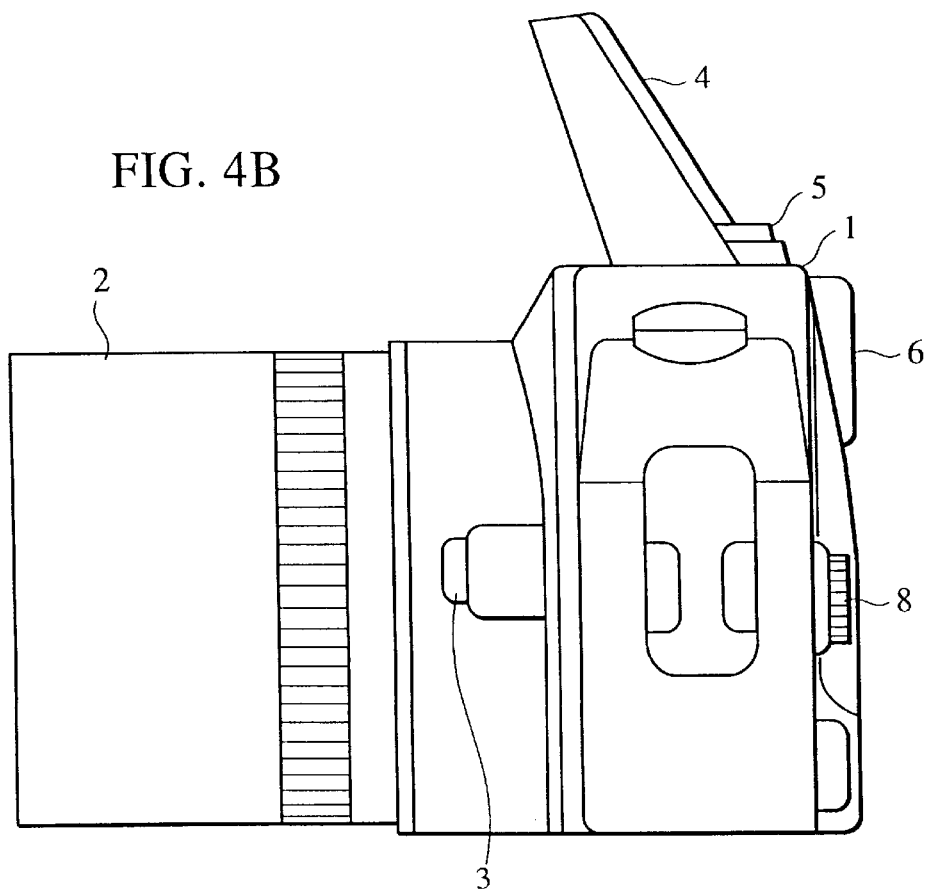

FIG. 1 is a front elevational view of a camera according to a first embodiment of the present invention, FIG. 2 is a top plan view of the camera shown in FIG. 1, and FIG. 3 is a rear elevational view of the camera shown in FIG. 1. Further, FIGS. 4A and 4B are side elevational views of the camera shown in FIG. 1, and, more specifically, FIG. 4A is a side elevational view showing a state in which a built-in electronic flash is accommodated in the camera body, and FIG. 4B shows a state in which the electronic flash is popped up.

In these figures, reference numeral 1 denotes a camera main body 1, reference numeral 2 denotes an interchangeable lens 2 detachably mountable on the camera main body 1, and reference numeral 3 denotes a lens dismounting button for dismounting the interchangeable lens 2 from the camera main body 1. Reference numeral 4 denotes a built-in electronic flash accommodated in the camera main body 1, and reference numeral 5 denotes an accessory shoe 5 for mounting an external electronic flash and the like on the camera main body 1. Reference numeral 6 denotes a finder for confirming a subject to be photographed. Reference numeral 7 denotes a main switch 7 for turning the camera ON and OFF. Reference numeral 8 denotes a mode dial for switching the various photo-taking modes of the camera. Reference numeral 9 denotes a turnable electronic dial through which various values of the camera, such as a shutter speed, an aperture value, and the like are input, and reference numeral 10 denotes a release switch 10 arranged as a two-step switch for starting and releasing light measurement and focal point (focus condition) detection.

Reference numeral 11 denotes a print type switch for switching a type of a print to be created after a film is developed. Reference numeral 12 denotes an AE lock switch for executing AE-locked photographing. Reference numeral 13 denotes an exposure correction switch for correcting exposure in combination with the electronic dial 9. Reference numeral 14 denotes a built-in electronic flash switch for using the built-in electronic flash 4. Reference numeral 15 denotes a self-timer switch 15 for using a self-timer built into the camera, and reference numeral 16 denotes a film rewinding switch for rewinding a loaded film.

Reference numeral 17 denotes an automatic focal point (focus condition) detecting mode switch (AF mode switch) for switching an automatic focal point detecting mode to any one of a one shot mode for fixing a focal point at a focused position and a servo mode for tracking a focused position of a moving subject at all times by continuously detecting the focal point of the subject. Reference numeral 18 denotes a switch (electronic flash mode switch) for switching the built-in electronic flash to any one of a mode for emitting only auxiliary light, a mode for emitting light only in a film exposing operation, and a mode for emitting auxiliary light as well as emitting light in a film exposing operation. Reference numeral 19 denotes an all-frames-same-print switch (FTPM switch) for designating the same print conditions to all the frames. Reference numeral 20 denotes an external liquid crystal display device composed of a liquid crystal display member for displaying various operation states to which the camera may be set, the number of frames that have been photographed, an operation mode of the built-in electronic flash, and the like. Reference numeral 21 denotes a red-eye-reduction lamp for reducing a red eye phenomenon that is caused when photographing is executed using an electronic flash.

FIG. 5 is a view showing a displaying state of the external liquid crystal display device 20.

Of the operation modes of the built-in electronic flash 4, FIG. 5A illustrates a state of display for prohibiting emission of light in the film exposing operation, that is, a state of display for emitting only auxiliary light. FIG. 5B illustrates a state of display for prohibiting emission of auxiliary light, that is, a state of display for emitting light only in the film exposing operation. FIG. 5C illustrates a state of display for emitting auxiliary light as well as emitting light in the film exposing operation.

Each time the electronic flash mode switch 18 shown in FIG. 3 is depressed, an operation mode of the built-in electronic flash 4 changes in the cyclic sequence of FIG. 5A, FIG. 5B, and FIG. 5C, and the external liquid crystal display device 20 displays a setting according to a mode employed at that time.

Figure 6:
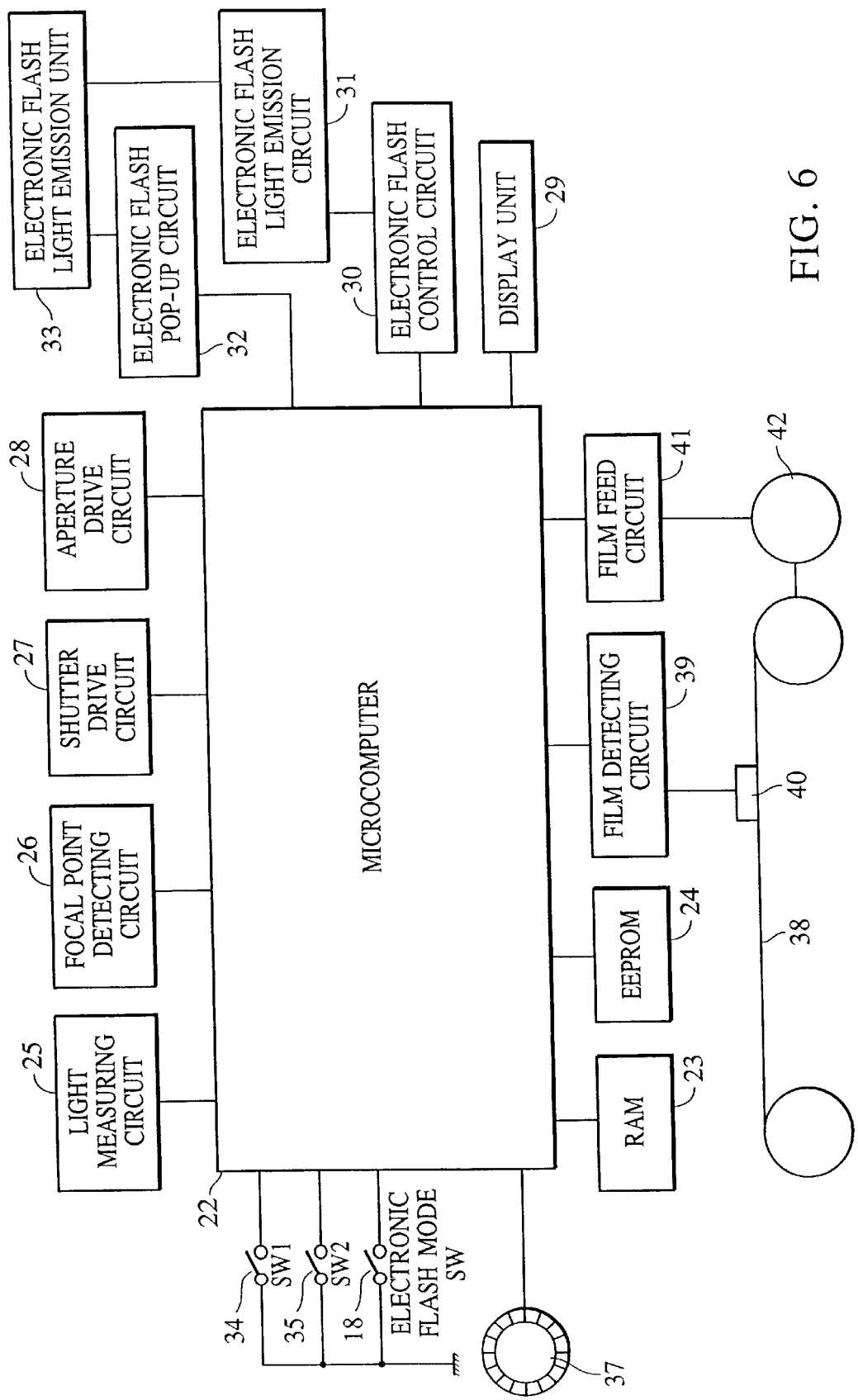
FIG. 6 is a block diagram showing an electric arrangement of the camera according to the first embodiment of the present invention.

FIG. 6 is a block diagram showing a main portion of an electric arrangement of the camera according to the embodiment of the present invention.

In FIG. 6, reference numeral 22 denotes a microcomputer for controlling the camera in its entirety. Reference numeral 23 denotes a RAM acting as memory means built in or mounted on the outside of the microcomputer 22. Reference numeral 24 denotes an EEPROM acting as a non-volatile memory built in or mounted on the outside of the microcomputer 22. Reference numeral 25 denotes a light measuring circuit connected to the microcomputer 22 for measuring the brightness of a subject. Reference numeral 26 denotes a focal point detecting circuit connected to the microcomputer 22 for executing an auto-focus operation. Reference numeral 27 denotes a shutter drive circuit connected to the microcomputer 22 for driving a shutter during a photo-taking operation. Reference numeral 28 denotes an aperture drive circuit 28 for stopping down and opening up an aperture (not shown) disposed in the interchangeable lens 2. Reference numeral 29 denotes a display unit 29 acting as the display element portion of the external liquid crystal display device 20 mounted on the rear surface of the camera main body 1. Reference numeral 30 denotes an electronic flash control circuit 30 for controlling the emission of the built-in electronic flash 4 of the camera main body 1 under the control of the microcomputer 22. Reference numeral 31 denotes an electronic flash light emission circuit 31, the light emitting operation of which is controlled by the electronic flash control circuit 30. Reference numeral 32 denotes an electronic flash pop-up circuit controlled by the microcomputer 22 to pop up the built-in electronic flash 4 from the camera main body 1, e.g., using a magnet (not shown). Reference numeral 33 denotes an electronic flash light emission unit 33, the light emission of which is controlled by the electronic flash light emission circuit 31 and the pop-up operation of which from the camera main body 1 is controlled by the electronic flash pop-up circuit 32.

Reference numeral 34 (SW1) denotes a switch that is turned on by half-depressing the release switch 10 arranged as a two-stage switch and starts to measure light and to detect a focal point, and reference numeral 35 (SW2) denotes a release switch that is turned on when the release switch 10 is totally depressed and starts exposure. Reference numeral 18 denotes the aforementioned electronic flash mode switch for switching among the operation modes of the built-in electronic flash 4, i.e., the mode for emitting only auxiliary light, the mode for emitting light only in the film exposing operation, and the mode for emitting auxiliary light as well as emitting light in the film exposing operation. Each time the electronic flash mode switch 18 is turned on, these modes are switched in the cyclic sequence manner. Reference numeral 37 denotes an electronic detector for electrically detecting a turning position of the electronic dial 9, and the microcomputer 22 changes various information by detecting the motion of the detector 37. Reference numeral 38 denotes a film loaded in the camera main body 1.

Reference numeral 39 denotes a film detecting circuit for detecting a position of the film 38 under the control of the microcomputer 22. Reference numeral 40 denotes a photo sensor driven by the film detecting circuit 39 for detecting a position of the film 38. Reference numeral 41 denotes a film feed circuit for winding and rewinding the film 38 under the control of the microcomputer 22, and reference numeral 42 denotes a film feed motor driven by the film feed circuit 41 for winding and rewinding the film 38.

Figure 7:
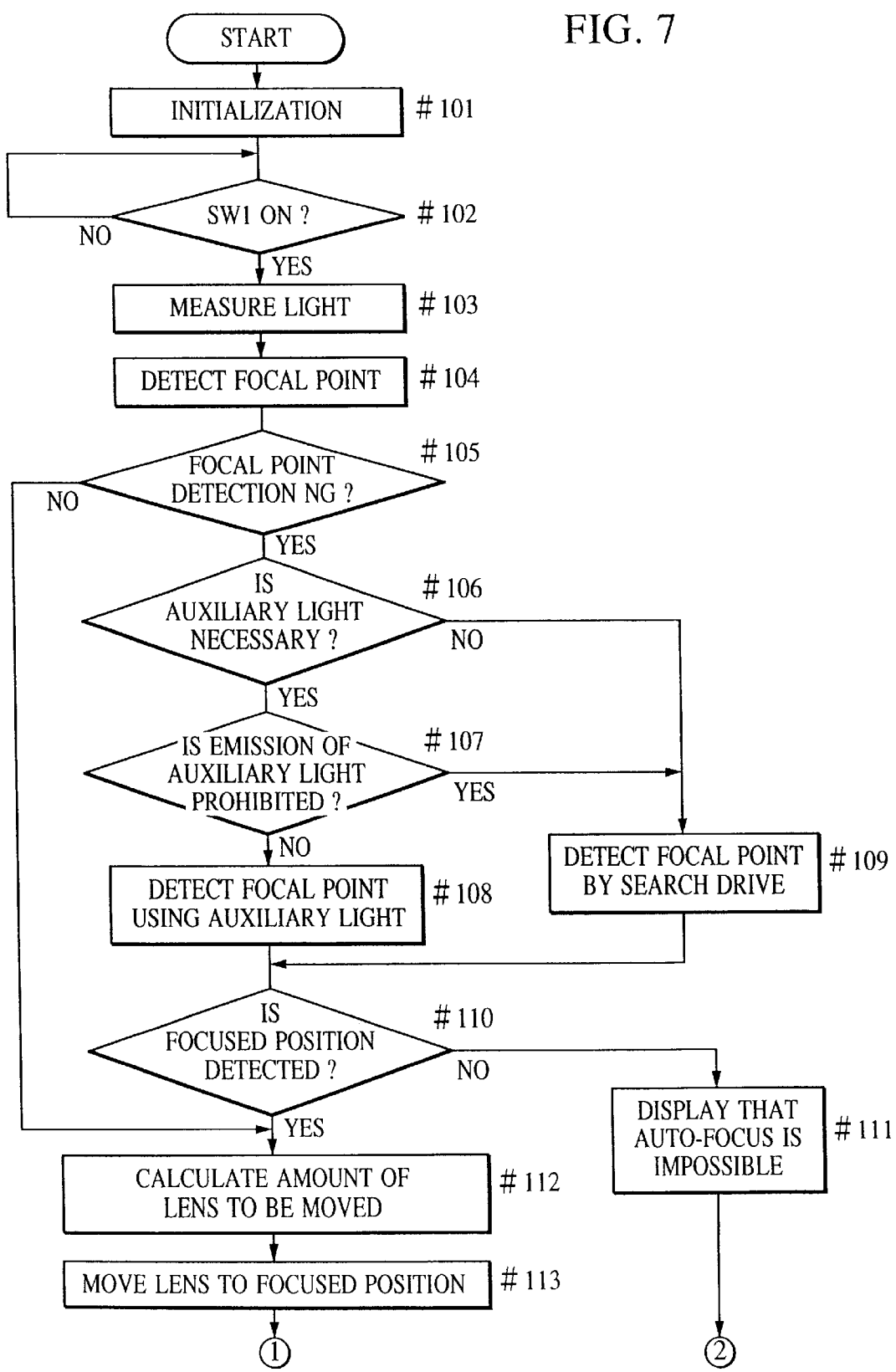
FIG. 7 is a flowchart showing a part of a light measuring operation, a focal point detecting operation, and a photographing operation executed by a microcomputer of the camera according to the first embodiment of the present invention.
Figure 8:
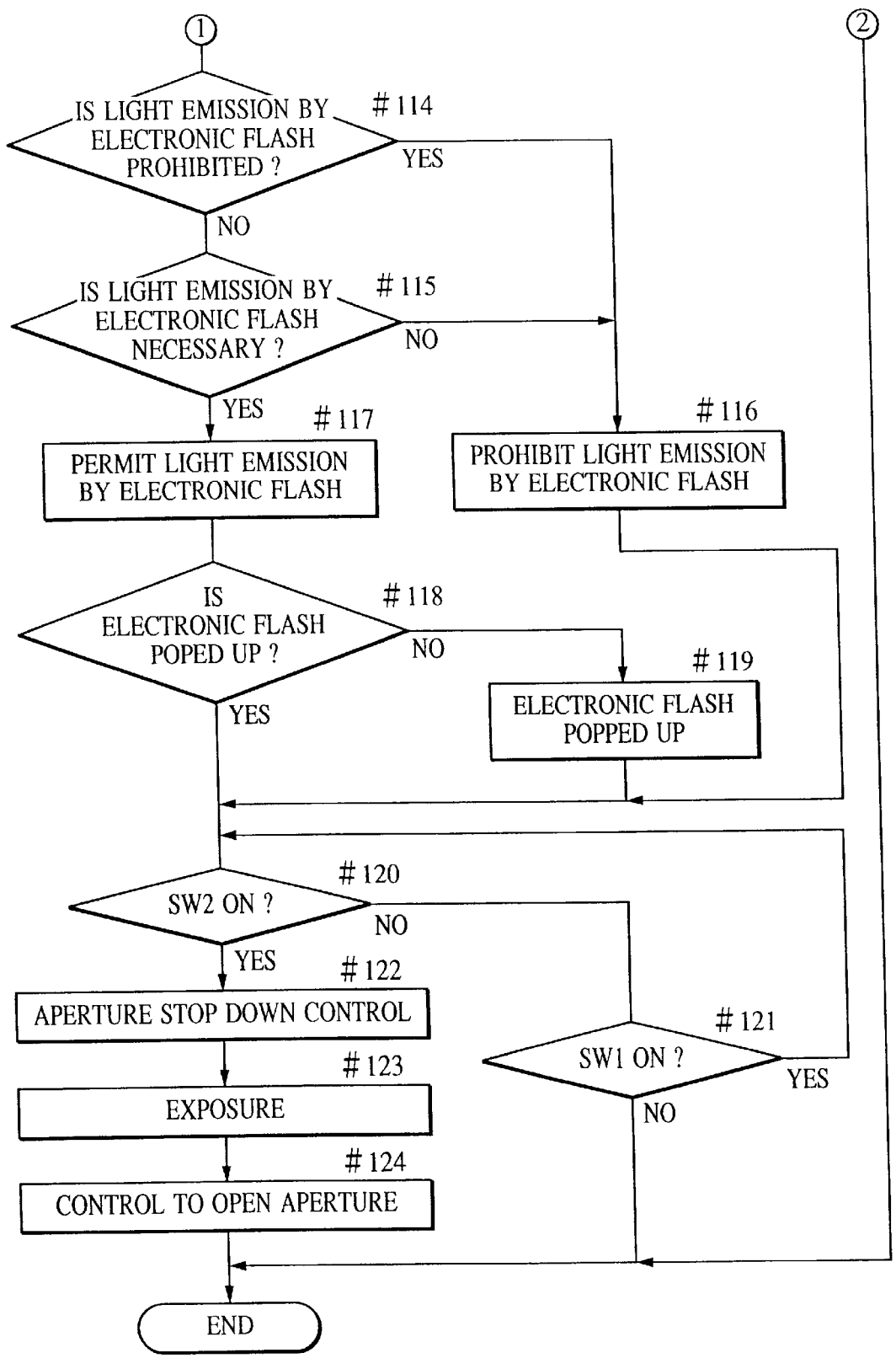
FIG. 8 is a flowchart showing the subsequent part of the operations shown in FIG. 7.
Figure 9:
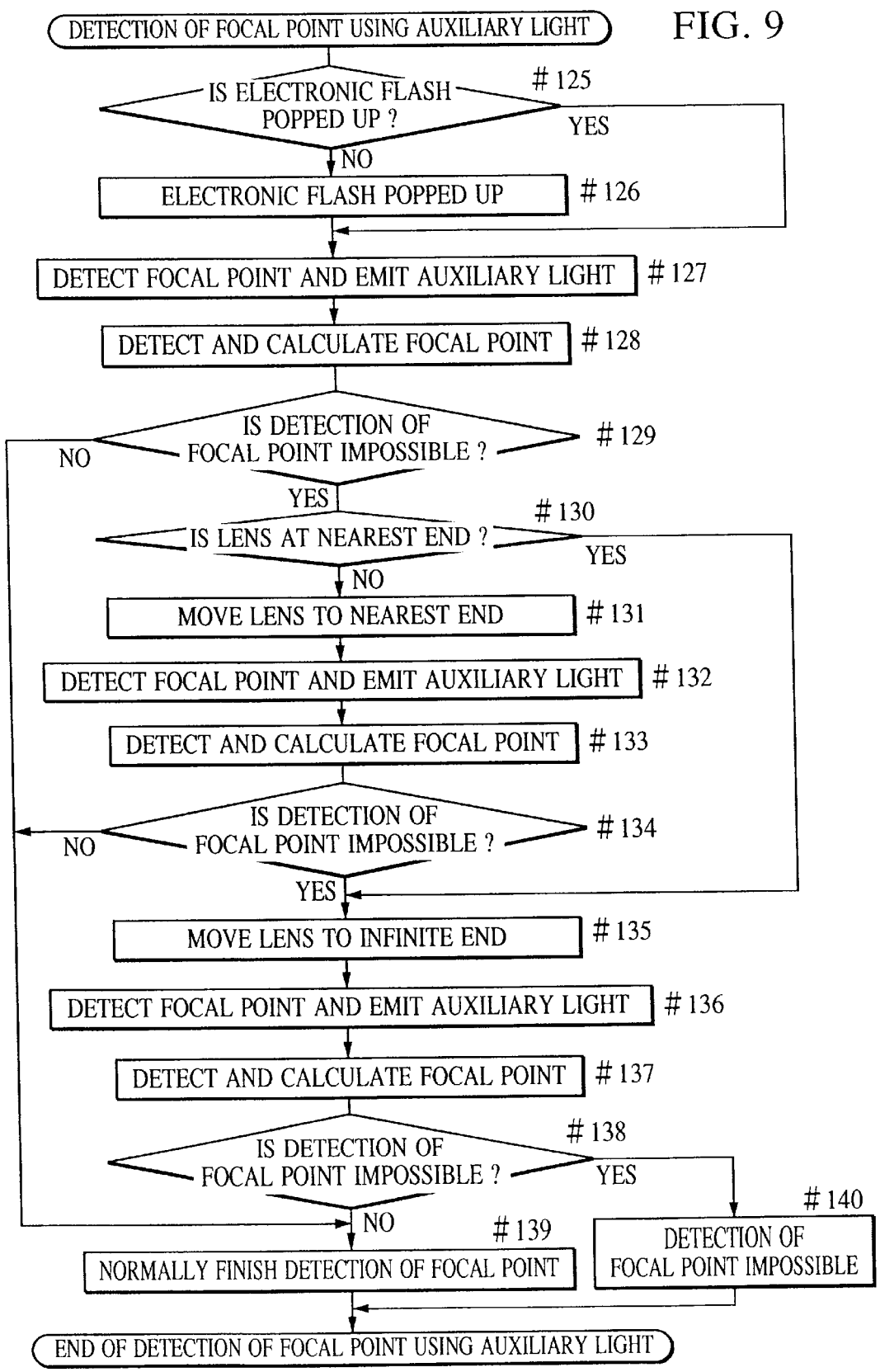
FIG. 9 is a flowchart showing the operation executed at step #108 of FIG. 7 in detail.

FIGS. 7 to 9 are flowcharts showing the light measuring, focal point detecting, and photographing operations of the microcomputer 22 provided with the camera arranged as described above. The respective operations will be described below with reference to these figures.

When the main switch 7 of the camera main body 1 changes its position from an "L" (locked) position to an "A" (auto) position, the microcomputer 22 starts operation from step #101.

First, at step #101, the RAM 23, the various control circuits, and the like are initialized. Then, at the next step #102, the state of the switch SW1 that is turned on by half-depressing the release switch 10 is examined. When the switch SW1 is turned on, the microcomputer 22 goes to step #103, whereas when it is not turned on, the process waits at step #102.

When it is detected that the switch SW1 is turned on, the microcomputer 22 goes to step #103 and operates the light measuring circuit 25 to measure the brightness of a subject. Then, the microcomputer 22 determines a shutter speed and an aperture value that are optimum to a photographing mode from the brightness of the subject and the information of the sensitivity of the film 38 and displays them on the display unit 29. At that time, the shutter speed and the aperture value are determined so as to have appropriate values depending upon whether the mode in which the built-in electronic flash 4 is used in the film exposing operation is employed or the mode in which the electronic flash 4 is not used therein is employed.

At the next step #104, the microcomputer 22 operates the focal point detecting circuit 26 and executes a focal point detecting operation by executing focal point detection processing of a known TTL phase difference detection method. At the next step #105, it is determined whether the focal point can be detected or it cannot be detected because the contrast of the subject is low or the brightness thereof is dark (detection of focal point is NG) as result of the focal point detecting operation executed at step #104. When the detection of focal point is NG, the microcomputer 22 goes to step #106, whereas when the focal point can be detected, the microcomputer 22 goes to step #112.

When the microcomputer 22 goes to step #106 because the detection of focal point is NG, it examines a reason why the focal point cannot be detected at step #104. When the reason is that the subject is too dark to be detected, the microcomputer 22 determines that auxiliary light is necessary because the focal point may be detected when the subject is illuminated with auxiliary light irradiated thereto. Then, the microcomputer 22 goes to step #107 at which it determines whether or not the mode for not emitting auxiliary light (emission of auxiliary light prohibiting mode) is set by the electronic flash mode switch 18. When the emission of auxiliary light prohibiting mode is set, the microcomputer 22 goes to step #109, whereas when this mode is not set, the microcomputer 22 goes to step #108. When the microcomputer 22 goes to step #108, the focal point is detected by irradiating auxiliary light to the subject, and then the microcomputer 22 goes to step #110. Note that the focal point detecting operation executed using the auxiliary light will be described below in detail.

Further, when the focal point cannot be detected at step #106, regardless of whether the subject is bright, there is a low possibility that the focal point can be detected even if the subject is illuminated with auxiliary light, and the microcomputer 22 determines that auxiliary light is not necessary and goes to step #109. Further, when the emission of auxiliary light prohibiting mode is set at step #107, the microcomputer 22 also goes to step #109 as described above. Then, at step #109, the focal point is detected by a search drive which is executed by a known TTL phase difference detecting method by moving the lens to a nearest end or to an infinite end because the mode for not emitting auxiliary light is set regardless of whether the reason why the focal point cannot be detected at step #104 is not that the subject is dark. Then, the microcomputer 22 goes to step #110.

At step #110, the microcomputer 22 determines whether or not a focused position could be detected from a result of the focal point detections executed at step #108 using auxiliary light and at step #109 by means of the search drive. When the focused position could not be detected, the microcomputer 22 goes to step #111 and displays that auto-focusing is impossible (auto-focusing NG) on the display unit 29, because the focused position of the subject could not be detected even if the focal point was detected ordinarily or using auxiliary light or by means of the search drive, and stops the focal point detecting operation.

In contrast, when the microcomputer 22 determines that the focused position could be detected at step #110, the microcomputer 22 goes to step #112 and calculates the amount of focal point, which is to be moved to the focused position, of the interchangeable lens 2 mounted on the camera main body 1 according to the result of detection of the focal point obtained at that time. Then, at the next step #113, a lens drive circuit (not shown) disposed in the interchangeable lens 2 is driven, thereby moving the focusing lens of the interchangeable lens 2 to the focused position.

At the next step #114, shown in FIG. 8, it is determined whether or not the built-in electronic flash 4 is set by the electronic flash mode switch 18 to the mode in which the electronic flash is used in the film exposing operation. When the built-in electronic flash 4 is not set to this mode, the microcomputer 22 goes to step #116 because the operation mode of the built-in electronic flash 4 is set to the mode in which the emission of the electronic flash is prohibited. Whereas when the operation mode is set to the mode in which the electronic flash is used in the film exposing operation, the microcomputer 22 goes to step #115 and determines whether or not the value of light measured at step #103 requires that auxiliary light be emitted by the built-in electronic flash 4. When it is necessary for the built-in electronic flash 4 to emit auxiliary light, the microcomputer 22 goes to step #117. Otherwise, the microcomputer 22 goes to step #116.

When the microcomputer 22 goes to step #116, a signal for prohibiting the built-in electronic flash 4 from emitting auxiliary light is output to the electronic flash control circuit 30 because the built-in electronic flash 4 is not used in the film exposing operation at step #116, and then the microcomputer 22 goes to step #120.

Further, when the microcomputer 22 goes to step #117, a signal for permitting the built-in electronic flash 4 to emit auxiliary light is output to the electronic flash control circuit 30 because the built-in electronic flash 4 is used in the film exposing operation in this operation mode. At the next step #118, it is determined whether or not the built-in electronic flash 4 is popped up. When the electronic flash 4 is popped up, the microcomputer 22 goes to step #120, whereas when the electronic flash 4 is not popped up, the microcomputer 22 goes to step #119 and pops it up by controlling the electronic flash pop-up circuit 32 so that it emits light in the film exposing operation. Then, the microcomputer 22 goes to step #120.

At step #120, the state of the switch SW2 that is turned on by totally depressing the release switch 10 is examined. When the switch SW2 is not turned on, the microcomputer 22 goes to step #121 and examines the state of the switch SW1. When the switch SW1 also is not turned on, the microcomputer 22 finishes the operation. Further, when the switch SW1 is turned on, the microcomputer 22 returns to step #120 and waits to determine whether the switch SW2 is turned on as long as the switch SW1 is not turned off.

In this embodiment of the present invention, when the lens is moved to the focused position once, no focal point detecting operation is executed while the switch SW1 is turned on and the switch SW2 is turned off. However, there is also a method in which the focal point detecting operation is repeated in this state, and when a subject does move, the lens is driven so as to keep a focused position at all times in accordance with the movement of the subject.

Thereafter, when the microcomputer 22 determines that the switch SW2 is turned on at step #120, the microcomputer 22 goes to step #122 and drives the aperture drive circuit 28 to stop down the aperture to the value determined in the light measuring operation executed at step #103 or to the value set by a photographer. At the next step #123, the microcomputer 22 drives the shutter drive circuit 27 and opens and closes the shutter at the shutter speed determined by the light measuring operation executed at step #103 or at the shutter speed set by the photographer, whereby the film 38 is exposed. When the electronic flash is permitted to emit light here, the electronic flash control circuit 30 causes the electronic flash to emit light in a predetermined amount by operating the electronic flash light emission circuit at a time the shutter is totally opened. Next, at step #124, the shutter stopped down at step #122 is returned to its released state by driving the aperture drive circuit 28, and the microcomputer 22 finishes the series of light measuring, focal point detecting and photographing operations.

Next, the focal point detecting operation executed at step #108 using auxiliary light will be described below in detail with reference to the flowchart of FIG. 9.

First, at step #125, the microcomputer 22 determines whether or not the built-in electronic flash 4 is popped up from the camera main body 1. When the built-in electronic flash 4 is in a popped-up state, the microcomputer 22 goes directly to step #127. However, when the built-in electronic flash 4 is not popped up, the microcomputer 22 goes directly to step #126 and pops up the built-in electronic flash 4 by operating the electronic flash pop-up circuit 32 and then goes to step #127. When the built-in electronic flash 4 is not charged at that time, a charge operation will be executed thereto.

Next, at step #127, the image of the subject is accumulated on a sensor by operating the focal point detecting circuit 26, and then the electronic flash light emission circuit 31 is operated by the electronic flash control circuit 30 to cause the electronic flash to emit auxiliary light intermittently, whereby the image of the subject is detected while illuminating the subject. At the next step #128, the microcomputer 22 executes an arithmetic operation for detecting the focal point based on the image of the subject while irradiating auxiliary light at step #127, then at subsequent step #129, the microcomputer 22 determines whether or not the focal point can be detected from a result of the arithmetic operation for detecting the focal point executed at step #128. When the focal point can not be detected (detection of focal point NG), the microcomputer 22 goes to step #130, whereas when the focal point cannot be detected, the microcomputer 22 goes to step #139.

When the microcomputer 22 goes to step #130, it determines whether or not the focused position of the interchangeable lens 2 is located at the nearest end. When it is located at the nearest end, the microcomputer 22 goes to step #135. Otherwise, the microcomputer 22 goes to step #131 and moves the focused position of the interchangeable lens 2 to the nearest end. At the next step #132, the image of the subject is detected by intermittently emitting the built-in electronic flash 4 similarly to step #127. Then, at subsequent step #133, the microcomputer 22 executes an arithmetic operation for detecting the focal point similarly to step #128. When the focal point cannot be detected (detected of focal point NG) at step #134 based on a result of the arithmetic operation executed at step #133, similarly to step #129, the microcomputer 22 goes to step #135. Otherwise, the microcomputer 22 goes to step #139.

At step #135, the focused position of the interchangeable lens 2 is moved to the infinite end. Then, at the next steps #136 and #137, the focal point is detected and an arithmetic operation for detecting the focal point is executed while emitting auxiliary light, similarly to steps #132 and #133. Then, at subsequent step #138, the microcomputer 22 determines whether or not the detection of focal point is NG similarly to step #134. When the detection of focal point is NG, the microcomputer 22 goes to step #140 and determines that the focal point cannot be detected (detection of focal point NG) because the focal point could not be detected regardless of whether it was detected at the initial position of the focal point of the interchangeable lens 2 and the nearest end and the infinite end thereof. Thus, the microcomputer 22 finishes the detection of focal point using auxiliary light.

In contrast, when the microcomputer 22 determines that the focal point can be detected, (detection of focal point OK), the microcomputer 22 goes to step #139 from step #138 and finishes the detection of focal point, whereby the detection of focal point by auxiliary light is finished.

According to the above embodiment, the operation of the electronic flash mode switch 18 permits the photographer to select any of the operation modes of the built-in electronic flash 4, i.e., the mode for emitting only auxiliary light, the mode for emitting light only in the film exposing operation, and the mode for emitting auxiliary light as well as emitting light in the film exposing operation. As a result, the photographer can properly use the built-in electronic flash 4 according to his or her intention for creating a picture and to the environments in which the built-in electronic flash 4 is used.

(Modified Embodiment)

While the switch for setting any of the operation modes of the electronic flash is provided independently in the above embodiment, it may be set using a known custom function for permitting the photographer to set an operation mode he or she desires by minutely changing the various functions of the camera according to his or her style of photographing (single lens reflex cameras and the like include this custom function as an ordinary function).

Specifically, as an example, the mode for emitting only auxiliary light as shown in FIG. 5A may be allocated to a custom function No. 1, the mode for emitting light only in the film exposing operation as shown in FIG. 5B may be allocated to a custom function No. 2, and the mode for emitting auxiliary light as well as emitting light in the film exposing operation as shown in FIG. 5C may be allocated to a custom function No. 3, so that any intended operation mode of the electronic flash can be set by inputting a number of the custom function.

Further, while the above embodiment shows the example in which an electronic flash built into the camera is used, the present invention is not limited thereto, and even if a system is employed that includes an external electronic flash which can be mounted on the camera and emit auxiliary light, an effect similar to that of the above embodiment can be obtained by setting any of the operation modes of the external electronic flash in the same manner.

As described above, according to the present invention, there can be provided a camera and camera system which permit photographers to properly use the electronic flash easily according to his or her intention for creating a picture and to the environment in which the electronic flash is used.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera system having an objective lens and a focus condition detecting device, comprising:

an illumination device operable to illuminate a subject; and a photo-taking mode setting member capable of setting the camera system in one of:

(a) a first mode, in which said illumination device emits auxiliary light during a focus condition detection operation of the focus condition detection device, and emits light during a recording medium exposure operation;

(b) a second mode, in which said illumination device emits auxiliary light during a focus condition detection operation of the focus condition detection device, but does not emit light during a recording medium exposure operation; and (c) a third mode, in which said illumination device emits light during a recording medium exposure operation, but does not emit auxiliary light during a focus condition detection operation of the focus condition detecting device.

2. A camera system according to claim 1, wherein said photo-taking mode setting member is a single member.

3. A camera system according to claim 1, wherein said illumination device is accommodated in a camera body and is movable to a light emission position for a light emission operation.

4. A camera system according to claim 1, further comprising a display that displays an operation mode of the camera system set by said photo-taking setting member.

* * * * *

UNITED STATES PATENT AND TRADEMARK OFFICE
CERTIFICATE OF CORRECTION

PATENT NO.    : 6,473,568 B2
DATED         : October 29, 2002
INVENTOR(S)   : Ritsuo Kashiyama It is certified that error appears in the above-identified patent and that said Letters Patent is hereby corrected as shown below:

Drawings,
Sheet 8, figure 8, "POPED" should read -- POPPED --.

Column 1,
Line 41, "refrained" should read -- refrained from, --.

Column 2,
Line 41, "(detected" should read -- (detection --.

Signed and Sealed this

Twenty-second Day of April, 2003

JAMES E. ROGAN
*Director of the United States Patent and Trademark Office*